UNITED STATES PATENT OFFICE.

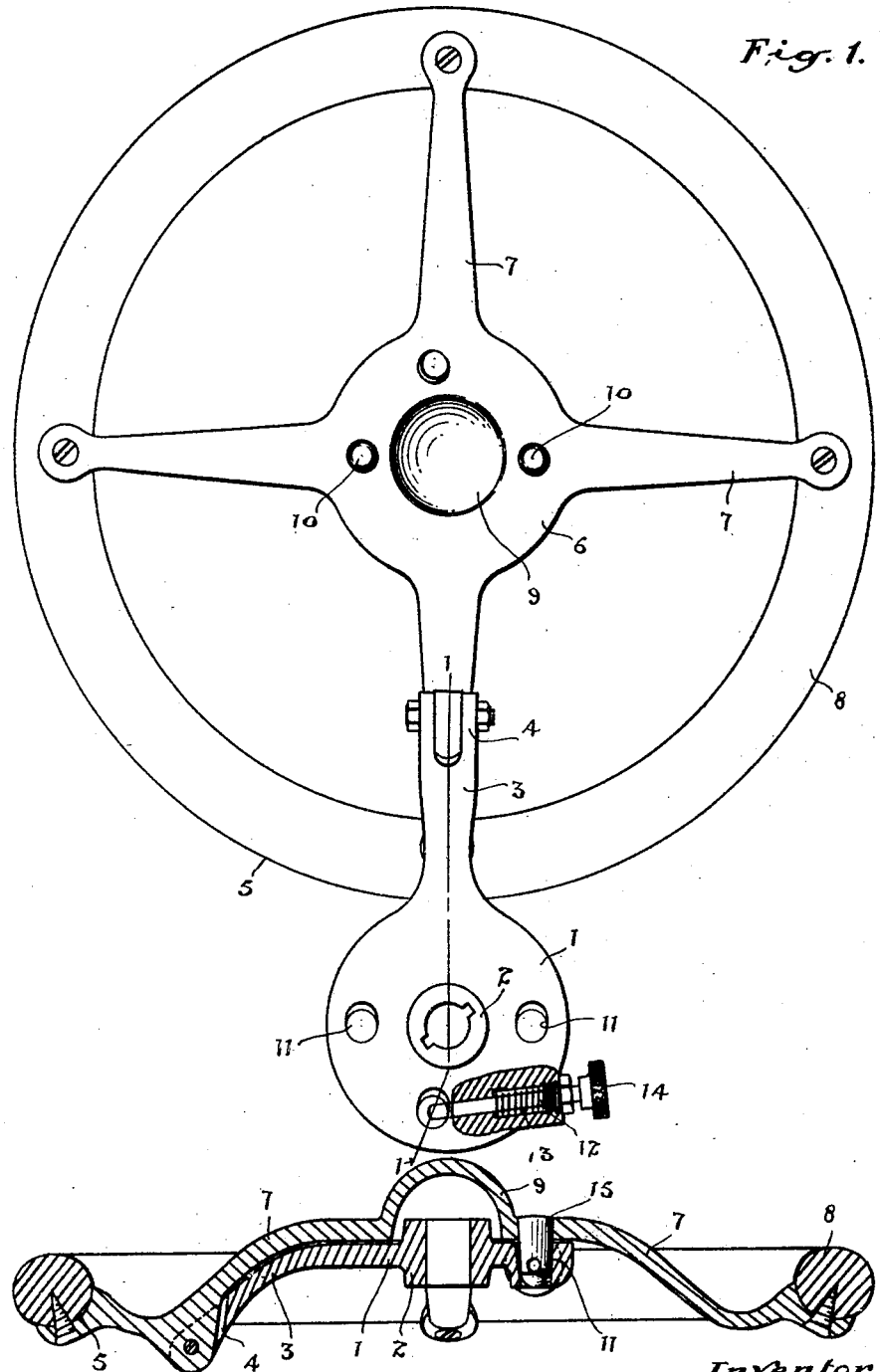

ALBERT A. BOGGS, OF TORONTO, ONTARIO, CANADA.

MOTOR-CAR-STEERING WHEEL.

1,410,159.   Specification of Letters Patent.   Patented Mar. 21, 1922.

Application filed February 10, 1920. Serial No. 357,604.

*To all whom it may concern:*

Be it known that I, ALBERT A. BOGGS, a citizen of the United States of America, and resident of the city of Toronto, county of York, Province of Ontario, in the Dominion of Canada, have invented certain new and useful Improvements in Motor-Car-Steering Wheels, described in the following specification and illustrated in the accompanying drawings, that form part of the same.

The principal objects of this invention are, to enable the driver of a motor car getting into and out of his seat with the least amount of difficulty and inconvenience through the proximity of the steering wheel, and to devise a form of steering wheel connection, which is extremely simple in construction and is very rigid when locked but which may be moved entirely out of the way of the driver when getting into and out of his seat with a very simple operation.

The principal feature of the invention consists in the novel construction and arrangement of parts, whereby the steering wheel is pivotally mounted upon a member secured to the steering column and is rigidly locked in the closed position by a plurality of rigid stud members in one of the members entering corresponding openings in the adjacent member.

In the drawings, Figure 1 is a plan view showing the top of the member secured to the steering column and the wheel thrown back therefrom, part of the former member being broken away to show the locking bolt.

Figure 2 is a central sectional view showing the wheel in the closed position, the section being through the line 1—1 of the steering column member illustrated in Figure 1.

It is well known to those skilled in the art that a very heavy strain is being continuously placed upon the steering wheel of a motor car and that the connection between the wheel and steering post must be of a rigid nature. Various forms of steering wheels have been devised which would enable them being moved so as to allow the driver greater room in getting into and out of his seat and while some of these have been adopted they have only been placed in the higher priced cars owing to their being so expensive.

According to the present invention a very simple and rigid structure is produced and it consists of a disc-shaped member 1 formed with a central boss 2 which is keyed on to the steering column. The disc 1 is formed with an arm 3 extending radially from its periphery and preferably bent downwardly at the outer end and bifurcated forming a jaw 4.

The steering wheel 5 is of extremely simple form having a solid disc portion 6 formed with integral radiating arms 7 to which the rim 8 is secured.

The centre of the disc 6 is formed with a concaved portion 9 which extends over the boss of the disc 1 and the fastening nut of the steering column, thus presenting a smooth unbroken surface on the top of the wheel.

In the disc 6 of the wheel are rigidly secured a plurality of taper pins 10 preferably three in number. These pins are adapted to enter the holes 11 in the disc 1 and when the wheel is closed down they wedge tightly thereinto, making a very rigid connection between the wheel and the steering column dics. These pins when thus seated relieve the hinge connection between the wheel and the steering column support from any of the strain of the steering operation.

In order to lock the steering wheel in place I provide a suitable latch portion 12 which is arranged within an orifice 13 in the disc 1, the inner end of the latch 12 entering the central hole 11 and being spring held in its inner position. The latch portion is provided with a thumb grip 14 in the outer end by means of which it is disengaged from the pin 15 which is provided with a transverse hole into which the latch extends.

The bottom end of the pin 15 is suitably bevelled so that when the wheel is swung downwardly the bevelled surface will engage the latch portion, pushing it back as the pin enters the hole.

A device such as described is extremely simple to manufacture requires very little machining and it may therefore be manufactured at very low cost and will be strong and durable and attractive in appearance and it may thus be utilized on the cheaper grades of cars and be extremely effective.

What I claim as my invention is:—

A motor car steering wheel, comprising a disc having a central boss secured to the steering post, a wheel having a disc-shaped centre formed with a raised portion extending over said post, an arm extending radially from the post disc formed with a jaw-shaped end, a lug arranged upon one of the arms of the wheel centre and pivotally secured in said jaw, a taper pin secured in the wheel centre on the side of the post opposite to the arm in the disc centre when closed down thereon, a taper hole in the wheel centre adapted to receive said pin and a spring latch portion extending transversely into one side of said hole and adapted to engage said pin in locking contact to hold the wheel in locking engagement with the post disc.

ALBERT A. BOGGS.